United States Patent
Owen

(10) Patent No.: US 11,970,346 B2
(45) Date of Patent: Apr. 30, 2024

(54) SHEET HANDLING PROCESS AND APPARATUS

(71) Applicant: GS-MR GLASS AND STONE (MACHINERY AND ROBOTICS) UK & IRELAND LTD., Telford (GB)

(72) Inventor: Robert Owen, Telford (GB)

(73) Assignee: GS-MR GLASS AND STONE (MACHINERY AND ROBOTICS) UK & IRELAND LTD. (GB)

( * ) Notice: Subject to any disclaimer, the term of this patent is extended or adjusted under 35 U.S.C. 154(b) by 0 days.

(21) Appl. No.: 18/041,286

(22) PCT Filed: Aug. 11, 2021

(86) PCT No.: PCT/EP2021/072410
§ 371 (c)(1),
(2) Date: Feb. 10, 2023

(87) PCT Pub. No.: WO2022/034148
PCT Pub. Date: Feb. 17, 2022

(65) Prior Publication Data
US 2023/0322505 A1  Oct. 12, 2023

(30) Foreign Application Priority Data
Aug. 11, 2020 (GB) ...................................... 2012506

(51) Int. Cl.
*B65G 49/06* (2006.01)
(52) U.S. Cl.
CPC ......... *B65G 49/066* (2013.01); *B65G 49/067* (2013.01); *B65G 49/068* (2013.01); *B65G 2201/022* (2013.01)

(58) Field of Classification Search
None
See application file for complete search history.

(56) References Cited

U.S. PATENT DOCUMENTS 10,101,281 B2 * 10/2018 Kinoshita ............ B65G 49/066
2015/0014124 A1    1/2015 Tagawa et al.
(Continued)

FOREIGN PATENT DOCUMENTS

JP    2014150218 A * 8/2014 .......... B65G 49/061
WO    2009118952 A1    10/2009
(Continued)

OTHER PUBLICATIONS

International Search Report and Written Opinion of the International Searching Authority for International Application No. PCT/EP2021/072410 dated Nov. 5, 2021.
(Continued)

*Primary Examiner* — William R Harp
(74) *Attorney, Agent, or Firm* — Cook Alex Ltd.

(57) ABSTRACT

A process and apparatus for handling a rigid sheet is disclosed. The process comprises engaging opposing faces of a sheet at its periphery with engagement means providing a second engagement means, movable relative to the first and engaging the sheet with the second engagement means. The sheet is then moved relative to the second engagement means whilst the sheet is engaged with the first engagement means and is then clamped. The sheet is then moved to a desired orientation or location whilst maintaining the first and second engagement means in fixed relative position. The process is useful in handling glass sheeting and in the production of multiple glazed units and on an insulating glass production line.

20 Claims, 9 Drawing Sheets

(56) References Cited

U.S. PATENT DOCUMENTS

2016/0178536 A1    6/2016    Kinoshita et al.
2019/0039839 A1    2/2019    Brown et al.

FOREIGN PATENT DOCUMENTS

WO    2014139594 A1    9/2014
WO    2017199681 A1    11/2017

OTHER PUBLICATIONS

Combined Search and Examination Report under Sections 17 and 18(3) dated Feb. 3, 2022, by the UK Intellectual Property Office for GB Application No. GB2111531.6.

\* cited by examiner

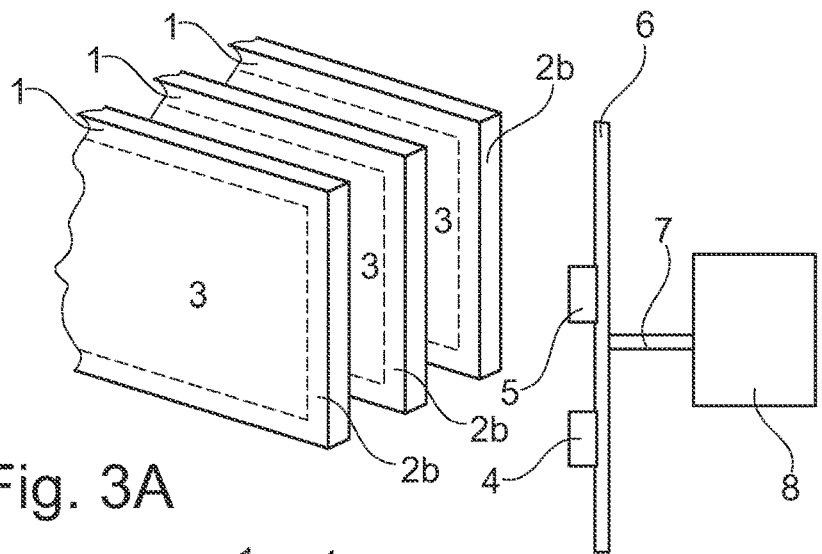
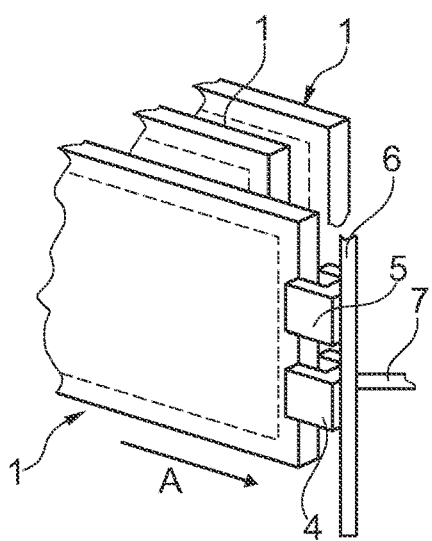
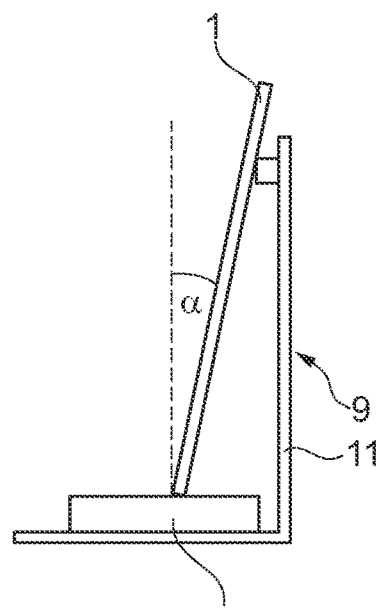
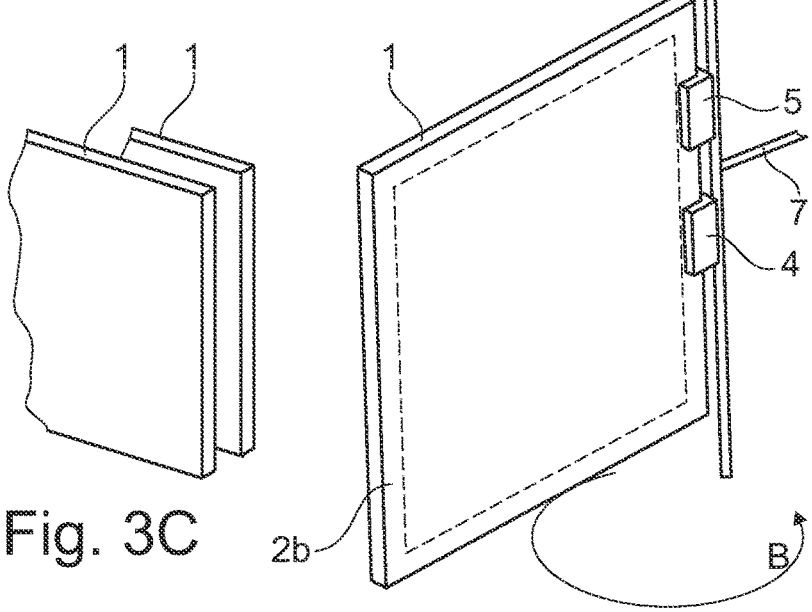

SHEET HANDLING PROCESS AND APPARATUS

CROSS-REFERENCE TO RELATED APPLICATIONS

This is a U.S. National Stage of International PCT Application No. PCT/EP2021/072410, filed Aug. 11, 2021, which claims the benefit of and priority to Great Britain Application No. 2012506.8, filed Aug. 11, 2020.

FIELD OF DISCLOSURE

This invention relates to a sheet handling process, particularly to a process for handling a sheet where the face of the sheet is susceptible to marking and to a product comprising a sheet handled in accordance with the process. The invention relates especially to a glass sheet handling process and to a product comprising a glass sheet handled in accordance with the glass sheet handling process.

BACKGROUND

Many materials are provided in rigid sheet form for example metal, plastics, glass, wood and artificial, manufactured materials such as plaster sheets and are subjected to a wide range of processes during their production, storage, handling, use, processing into manufactured goods and the like. In carrying out such process steps, a range of factors must be managed to ensure compliance with prevailing health and safety regulations and also to ensure the integrity of the sheet and maintenance of appropriate quality specifications according to the particular type of sheet and intended end-use to minimise losses and to avoid undesirable and environmental harmful wastage and consequent economic loss.

It is known to handle rigid sheets by use of a suction process in which a handling device having multiple suction pads or the like are brought into contact with the face of the sheet and a vacuum is formed between the devices and the sheet such that the weight of the sheet may be borne by the handling device to allow movement of the sheet from a first position to a second position and which may translation of the sheet to another position in the same orientation or involve reorientation of the sheet to allow further manipulation, storage or downstream processing of the sheet. The suction handling system allows the suction pads to be located in an approximate way and avoids the need for precise locating of the suction pads on the sheet or precise positioning of the sheet for engagement with the suction pads. Furthermore, any flexing or other movement of the sheet does not ordinarily present a problem.

Nevertheless, whilst such systems have been employed for many years, some sheet materials have surfaces or faces which must be kept clean or blemish free. Also, some sheets may comprise surface coatings which render the suction process less efficient or reliable and marks or damage due to the contact with the suction pads may arise.

US2016/0178536 describes a sheet member conveyance device having a support part configured to support a sheet and a moving part to move the support part. The support part also includes a deformation support part to support opposed ends of the sheet so as to deform part of the sheet into a curved shape to create a thread portion crossing a principle axis of the sheet, thereby changing the shape of the sheet during conveyance by forming a concave or convex thread portion. However, US2016/0178536 does not describe a process in which a rigid sheet in a finished form is conveyed without deforming the sheet so as to form a convex or concave thread portion.

Glass sheeting and plate glass is typically handled by a suction process and generally is satisfactory for standard handling where the sheets are all of the same size and subjected to the same manipulation. Where a batch of glass sheeting has different coatings or sheets are of differing sizes, problems due to suction marks, damage and complications in manipulation of the sheets may arise due to the need to locate the suction pads in different locations on sheets of differing size.

We have now devised a sheet handling process which allows a finished, rigid sheet to be handled in a manner which avoids contact with the face of the sheet other than at or near the periphery of the sheet whilst also enables precise handling when the sheet is susceptible to flexing in a direction out of the plane of the sheet.

SUMMARY

In a first aspect, the invention provides a process for handling a rigid sheet having two faces, each face comprising a peripheral area extending around the periphery of the sheet and the remainder of the face comprising an inner area, enclosed by the peripheral area, the process comprising:
  i) providing first engagement means adapted to engage the sheet on the peripheral area of at least one face and preferably on the peripheral areas of both opposing faces of the sheet and providing second engagement means, the first and second engagement means being adapted so as to enable relative longitudinal movement between the engagement means adapted to carry the weight of the sheet;
  ii) locating the first engagement means adjacent to the sheet and engaging the sheet on the at least one peripheral area on each face;
  iii) locating the second engagement means adjacent to the sheet;
  iv) optionally effecting relative longitudinal movement between the sheet and the second engagement means whilst the sheet is engaged by the first engagement means;
  v) engaging the sheet with the second engagement means so the sheet is held and its weight borne by the first and second engagement means; and
  vi) retaining the first and second engagement means engaged with the sheet in fixed relation and moving the engagement means and sheet to a second location.

In step vi), the support or supports are suitably movable both in and out of the plane of the rigid sheet in a direction that is parallel, perpendicular or orthogonal relative to a line between the first and second engagement means.

Advantageously, the process of the invention enables a sheet to be engaged at its peripheral area at or close to the periphery and handled whereby the inner area of the sheet is not subjected to contact in the handling process whether by conventional cups or other means, thereby avoiding creating scratches, blemishes or other undesirable marks. The shape of the sheet at the end of the process is the same as the shape of the sheet at the beginning of the process.

Suitably, the sheet may be moved in any desired direction, that is, in an "x", "y" and/or "z" axis in moving the sheet to the second location. The sheet is suitably oriented in a first plane at the time the first and second engagement means engage the sheet, the first and second engagement means may transpose the sheet, rotate the sheet and suitably, are adapted to move the sheet in a universal direction. The sheet may accordingly be moved into a different plane to that in which the sheet is engaged by the engagement means.

In a second aspect, the invention provides apparatus for handling a rigid sheet having two faces, each face comprising a peripheral area extending around the periphery of the sheet and the remainder of the face comprising an inner area, enclosed by the peripheral area, the apparatus comprising first engagement means adapted to engage at least one face and preferably both opposing faces of the sheet in the peripheral area, second engagement means adapted to engage at least one face and preferably both opposing faces of the sheet in the peripheral area, the first engagement means and/or second engagement means being adapted to move longitudinally relative to the other engagement means so as to enable relative movement therebetween, the first and second engagement means further being adapted to move in concert so as to maintain a fixed relative position whereby the rigid sheet may be transposed from a first location to a second location.

Suitably, the first and second engagement means are adapted to move in concert from the first location to the second location whilst remaining in a fixed relative position to each other, wherein an axis between the first and second engagement means in the second position is orthogonal to the axis between the first and second engagement means in the first position.

Reference herein to "longitudinal" or "longitudinally" refers to a locus or axis parallel or coincident with the edge of the sheet and longitudinal movement or longitudinally extending refers to movement or extension along that locus or axis. The locus or axis may be linear or non-linear depending on the shape of the edge of the sheet to be moved but in handling a planar sheet, the locus or axis is linear.

Suitably, the first engagement means and second engagement means are arranged to engage the sheet on the same edge of the sheet. The first and second engagement means are suitably adapted to move in a fixed relative position whilst engaged with the sheet. The sheet may then be moved through space by movement of the first and second engagement means in concert enabling the orientation or the sheet to be changed. Suitably, the sheet may be engaged in one location, and transposed to another location, for example by rotation of the sheet whilst being held by the engagement means.

The rigid sheet is not subjected to processing to change the shape of the sheet or to remove or detach parts of the sheet when moving the sheet from a first location to a second location.

The engagement means may comprise any known apparatus for engagement with a rigid and includes means which engage by vacuum, for example suction pads, or means which engage by applying opposing forces such that the sheet is in compression at the location of engagement, for example opposing gripping surfaces and opposing clamps adapted to move towards and away from each other so as to engage and retain the sheet.

In one embodiment, the first engagement means and/or second engagement means comprises an opposing pair of jaws. Suitably, the jaws comprise a clamping face on each jaw which may be of any shape provided it engages only within the peripheral area of the sheet. In another embodiment, the clamping face may, in use, extend along the peripheral area of the sheet and be parallel to the periphery of the sheet. In one embodiment, the first engagement means and/or second engagement means comprises a pair of jaws which comprise a fixed jaw and a jaw movable relative to the fixed jaw adapted to engage or release the sheet, each jaw having a parallel facing clamping surface.

The first and second engagement means may be mounted on independent supports or may be mounted on a common support. The common support is suitably moveable or the independent supports may be controlled so as to move in concert such that, the sheet, when engaged and being carried by the first and second engagement means, may be moved to a second location. The sheet may be transported, manipulated or orientated in any desired manner when carried avoiding contact or any need for contact with the inner area of the sheet and permitting precise and fine control of the specific location of the sheet to facilitate downstream handling and processing. Preferably, the apparatus comprises independent supports or a common support for the first and second engagement means configured to enable the first and second engagement means to engage with a first edge of the rigid sheet.

The support(s) are configured to enable the first and second engagement means to move in a manner such that the sheet may be moved out of its initial plane. The sheet may thereby be moved to a second location. While the engagement means are engaged with or gripping the sheet, the support or supports are movable both in and out of the plane of the rigid sheet such that the sheet may be moved from a first place to a second place within the plane of the sheet in a direction that is parallel, perpendicular or orthogonal relative to the edge of the sheet or a line between the first and second engagement means.

Suitably, the first and second engagement means are mounted on movable supports, and preferably on a common support. In a preferred embodiment, the support comprises a guide rail and the first and second engagement means are mounted on the locus of the rail. Preferably, the second engagement means is movable back and forth along the rail relative to the first engagement means. The first and second engagement means are adapted to engage with a first edge of the rigid sheet. If desired, further engagement means may be employed to engage with a second edge of the sheet orthogonal to the first edge. Suitably, the apparatus does not comprise engagement means located to engage with an edge of the sheet opposed to the first edge as this hinders movement of the sheet to the second location and complicates the apparatus and increases cost.

In a preferred embodiment, the process employs and the apparatus of the invention comprises first and second engagement means which are adapted to engage with a first edge of the sheet. Preferably, the apparatus does not include further engagement means for engagement with an opposing edge of the sheet. In another preferred embodiment, the apparatus comprises two and only two engagement means.

The peripheral area of the sheet is the area in which the engagement means engage the sheet without compromising the integrity of the face of the sheet by encroaching into the inner area. The inner area and hence peripheral area will be determined according to the nature of the sheet being handled and its intended and use. For example, where the sheet is glass, the inner area will extend over the whole area of the face of the glass sheet which will be visible to observers once the glass is in use. Suitably the peripheral area extends inwardly from the edge of the sheet to not more than 10% and desirably not more than 5% of the maximum dimension of the sheet. In one embodiment, the peripheral area extends to up 100 mm, preferably up to 50 mm, especially up to 15 mm and desirably up to 10 mm inwardly from the edge of the sheet.

The sheet may be moved to the support carrying the first engagement means or the support may be moved to the sheet.

The sheet may be moved to a pre-set location in order to be engaged by the apparatus. Suitably, the process comprises a sensing step in which the location of the sheet is detected and facilitates locating the sheet and first engagement means in proximity such that the first engagement means may engage the sheet. In a preferred embodiment, the apparatus comprises sheet-location sensors.

The second engagement means are suitably located adjacent to or close to the first engagement means and the second engagement means are located close to or adjacent to the sheet. Suitably, prior to engaging the second engagement means, relative movement between the first engagement means and the second engagement means is effected along the periphery of the sheet. The second engagement means is then suitably engaged with the sheet at a point distant from the first engagement means. In this way, the sheet may be held in a firm, secure and stable manner. The force with which the first and second engagement means engage the sheet may be independently variable. The engagement force for each engagement means is suitably selected having regard to the strength of the sheet, or the material from which the sheet is constructed, and having regard to the dimensions and weight of the sheet. In a preferred embodiment, the engagement force of each engagement means is the same. The engagement force may be altered having regard to the nature of the material form which the sheet is constructed.

In another embodiment, the process may comprise further engagement means to provide a third or further engagement point for the sheet. The third or further engagement means may be adapted to engage the sheet in the peripheral area on the same edge or another edge of the sheet. A third and further engagement means may be arranged to engage the sheet in the peripheral area bordering an edge perpendicular to the edge of the sheet which is engaged by the first and second pair of jaws. In another embodiment, a third or further engagement means may be arranged to engage the sheet in a peripheral area bordering and edge of the sheet opposite to that engaged by the first and second engagement means. In one embodiment, the process and apparatus of the invention comprises a third engagement means. In another embodiment, the process and apparatus of the invention comprises a third engagement means and a fourth engagement means.

The sheet may be of any configuration but is preferably planar. The process of the invention is especially suitable for handling planar rigid sheets.

During relative movement between the sheet and the second engagement means, the second engagement means may contact the sheet in the event that the plane of the sheet diverges from the locus of movement of the second engagement means thereby to hold the sheet in a pre-determined configuration. Suitably, the second engagement means are adapted to maintain the sheet between the second engagement means during the relative movement between the sheet and the second engagement means. In this way, the second engagement means may act to guide or straighten any distortion, flexing or deformity in the sheet as the sheet passes through the second engagement means during relative movement.

Preferably, the second engagement means is movable relative to the support.

Suitably, the engagement means comprises a pair of jaws and is of similar configuration to a vice with each jaw having a substantially planar clamping surface facing the clamping surface of the opposing jaw. The jaws are moveable so as to lessen or increase the distance between the clamping surfaces. The mechanism for moving the jaws is also adapted to close the jaws sufficiently tightly to ensure a reliable and safe clamping force is applied to the sheet having regard to the size and weight of the sheet.

In one embodiment, each jaw of the first opposing pair of jaws and/or the second opposing pair of jaws comprises a longitudinally extending clamping face which, in use, extends along the periphery of the sheet. A larger surface area aids clamping and also assists in maintaining the sheet in a stable aspect, reducing the risk of the sheet deforming or shuddering during movement.

The clamping face is dimensioned so as not to extend to the inner area of the sheet when in the clamped configuration. The clamping face of the jaws may be constructed of any suitable material for clamping the material from which the sheet is constructed, for example a rubber and rubberized material. The clamping surface may be smooth or have surface pattern or embossment to aid clamping as desired.

In a preferred embodiment, any one or more pairs of jaws comprise a fixed jaw and a movable jaw. The fixed jaw is suitably fixed relative to the support which carries that jaw. In an especially preferred embodiment, the first and second pair of jaws comprise a fixed jaw and a movable jaw.

Whilst the process of the invention is suitably for handling a sheet of any shape and size, it is especially suitably for handling a planar rigid sheet. Preferably, the first and second engagement means are arranged on a straight locus and the first and second engagement means are aligned on a common axis running parallel to the periphery of the sheet. The second engagement sheet is adapted for relative movement towards and away from the first engagement means along the axis or locus. Where the planar sheet is warped or flexed, the second engagement means is adapted to contact the sheet in a camming contact as it moves along the sheet so as to gently straighten the sheet to a planar configuration by virtue of the relative movement between the first and second engagement means and preferably as the second engagement means moves away from the first engagement means engaged with the sheet.

Suitably, at least one step of the process of the invention is automated or computer controlled, for example by an algorithm. The process is suitably controlled by a control system. The control system suitably contains or has access to information relating to the size of the sheet(s) required to produce a product in a downstream process, for example to produce a multi-sheet product and optionally its location. Suitably, the algorithm controls the apparatus of the invention such that it identifies a sheet, for example a glass sheet, of the required size at the sheet storage location. The control system may comprise data relating to the thickness of the particular sheet which is to be selected and the width, length and/or density of the material. In handling a glass sheet, the control system suitably has information on the thickness of the sheet to be selected, its width which will suitably be in the vertical or near vertical axis and the density of the glass or the weight of the sheet. The control system suitably determines and controls the vector of movement of each of the engagement means and the engagement force to be applied in engagement with the sheet.

Preferably, the apparatus of the invention comprises one or more sensors, preferably a sensor on or near each engagement means. The sensors suitably detect proximity, distance and/or weight and are in communication with the control system.

Suitably, sheets to be moved are stored in an array in a vertical or near vertical configuration, with spacing between adjacent sheets to permit the apparatus to engage with any selected sheet. Preferably, the apparatus of the invention engages with the sheet on the peripheral area on a vertical side of the selected sheet. Upon selecting the sheet, the first engagement means is brought into proximity with and engages the sheet in the peripheral area with a sensor guiding the engagement means into the desired position. The second engagement means suitably moves in a longitudinal direction away from the first engagement means and the sensor detects the end of the vertical edge and the second engagement means may then be finely controlled to a position for engagement with the peripheral area of the sheet on the same edge as the first engagement means. Upon engagement with the sheet, the apparatus suitably bears the weight of the sheet and the weight is sensed. The sensors are suitably configured to be able to determine the length of the vertical edge of the sheet and its weight, which then allows the horizontal length of the sheet to be determined. Suitably, the control system or remote data management system can compare the dimensions and/or weight of the selected sheet with information in the system relating to the desired or intended sheet to provide a cross check that the correct sheet has been selected. In the absence of correlation, the apparatus or system may provide an indication of error such that remedial action, for example manual or other intervention, may be taken.

Preferably, the process comprises a sensing step to locate the position of the sheet, especially the edge of the sheet, which is computer-controlled. Suitably, the sensor is adapted to measure the thickness of the sheet. In a preferred embodiment, the apparatus comprises a sensor and as the sheet and apparatus are brought in proximity, the sensor searches for the sheet, preferably the edge of the sheet, and upon detecting the sheet the location of the sensor aids in locating the first engagement means at the edge of the sheet. The sensor suitably has a limited sensor range within which to detect the sheet. In the event that the sheet is not detected within the sensor range after a pre-determined time, manual intervention or over-ride of the automated process may be employed. Manual over-ride may involve the operator cancelling the selection of the undetected sheet or resetting the apparatus to detect the next sheet.

Where the sensor provides a signal indicating that the sheet has not been detected, the sheet may be positioned by other means, for example manually, to enable the process of the invention to be carried out or the signal may include instruction to detect the next sheet.

Suitably, the apparatus is configured to engage with a vertical edge of the sheet. Preferably the first sensor allows location of the sheet and the first engagement means may then engage the vertical edge. The second engagement means suitably travels along the vertical edge of the sheet and a sensor is employed to detect the top horizontal edge of the sheet. Suitably the sensor is adapted to measure the thickness of the sheet. Whilst one sensor may be employed, preferably a plurality of sensors are employed.

Where the sensor(s) measure the thickness of the sheet, the data is suitably compared with a remote file or database containing a specification of the sheet and its thickness for example a .csv file. Measurement of the thickness and/or size of a sheet and correlation with data in a remote file or database advantageously allows the operator to cross-reference the sheet been processed with the intended sheet as set out in the database or file. Where the correlation is not correct, the apparatus suitably provides an indicator or warning to the operator so as to allow over-ride or manual intervention by the operator. This cross-reference system allows careful process management and quality control.

The process may be employed to handle a sheet in any production process to move a sheet to a desired location in a controlled manner to align the sheet in a particular location or relative position without contacting the face of the sheet in the inner area. The process is particularly suited to handling glass sheets, particularly to handling glass sheets in the production of double or multiple glazed products.

Glass sheets may be susceptible to slight deformation or flexing or warping, especially larger sheets. The invention provides a means of handling the sheet without compromising the inner area whilst reducing or avoiding difficulties associated with handling a warped or distorted sheet. Where the movement of the second engagement means relative to the first engagement means brings them into contact with the sheet, the movement force applied to the second engagement means may be adjusted in response to any increase in friction experienced by the engagement means so as to reduce the risk of undesirable imparting too greater a force to the sheet through the movement of the second engagement means and possible damaging or breaking the sheet. The force experienced by the engagement means may be detected by sensors providing an input to a control mechanism for the movement of the engagement means, providing a feedback control.

By engaging the sheet at its periphery, the invention advantageously allows glass having a wide range of different coatings to be handled without leaving marks, blemishes or the like on the inner area of the glass.

Where multiple sheets are stored in a parallel or near parallel arrangement with spacing between the sheets, for example a spacing about the same as the thickness of the sheet and at least greater than the thickness of the engagement means of the apparatus to allow the engagement means to pass into the gap between adjacent sheets, the process of the invention may be employed to select a particular sheet and to move, re-orientate or handle in any desired manner. The invention is particularly suitable for use in moving glass sheets on a harp cart as often employed in a glass sheet processing environment. Advantageously, the invention allows sheets to be selected and moved from a slot in a storage array of multiple sheets. Further, the process of the invention allows sheets to be treated, for example painted, prior to use or other assembly or manipulation as the treated or painted surface is not compromised by the handling process of the invention.

The process and apparatus of the invention facilitate the efficient handling of glass sheets in producing a multiple glass-sheeted product.

The invention provides in a further aspect a process for the production of a multiple sheet product, preferably a glass-sheet product, comprising two or more parallel sheets comprising providing a first sheet in a first location, engaging, for example clamping a second sheet in a remote location according to a process as defined according to the invention and moving the second sheet to a position parallel to and in alignment with the first sheet and sealing the edges of the first sheet and second sheet to enclose a volume between the sheets to provide a multiple-sheet product.

In producing a multiple-glazed unit, glass sheets are typically stored in an array in which the sheets are parallel and vertical or near-vertical and separated such that the faces of the glass are accessible such that the glass sheet may be removed from the array for processing. The glass sheets may be arranged on a conventional movable transport device, for example a harp cart. In a conventional process, the array of glass sheets is typically arranged close to an insulated glass (IG) processing line. An IG line typically comprises a conveyor means, for example tyres and belts, on which the glass is located in a near vertical arrangement with the bottom edge of the glass sheet contacting the conveyor means and the peripheral area along the top edge leaning against a retaining rail. Suitably, the glass sheet is at an angle of 4 to 10° from the vertical, for example 6°.

During processing, the engagement means and suitably the second engagement means of the apparatus according to the invention are located adjacent to the sheet to be selected for processing in the array and engage with the sheet in the peripheral area of the sheet. The sheet is suitably removed from the array and rotated into the desired orientation for loading on to the IG line, for example typically through 90°, without the inner area of the face of the glass on both sides being contacted with anything, thereby reducing the risk of blemishes or other visual imperfections often associated with conventional handling techniques. The glass sheet is suitably aligned "end-on" with the direction of movement of the IG line, placed on the line by the apparatus and conveyed in a near vertical orientation through the IG process.

Information relating to each sheet in the array may be contained in a control system such that the apparatus according to the invention may be programmed to select a particular sheet for any given process run, thereby facilitating process automation.

Glass sheets handled in accordance with the process of the invention are suitably processed by locating beading, for example butyl bead, along the peripheral area locating a spacer on the bead, locating a second butyl bead in opposition to the first bead and locating a second sheet of glass on the second bead. The assembly comprising two or more sheets of glass separated from the adjacent sheet by a bead-spacer-bead arrangement may then be sealed by the application of adhesive around the periphery so as to seal adjacent sheets of glass together. As desired, the internal void between adjacent sheets may be evacuated to provide a vacuum or a gas, preferably an inert gas, for example argon or xenon, may be inserted into the void between the glass sheets.

The invention further provides a process for the production of a multiple glazed unit comprising a first and second sheet of glass in opposition and sealed about their peripheries wherein the sheets of glass are selected and handled by a handling process according to the invention and placed on an IG line without any contact of the inner area with a foreign body.

In a preferred embodiment, the invention provides a process for the production of a multiple-sheet product comprising two or more parallel sheets comprising providing a first sheet in a first location, engaging, for example clamping, a second sheet in a remote location according to a sheet handling process according to the invention and moving the second sheet to a position parallel to and in alignment with the first sheet and sealing the edges of the first sheet and second sheet to enclose a volume between the sheets to provide a multiple-sheet product.

Advantageously, a wide range of glasses, having different coatings may be handled without practical compromise to the glass surface or coating, that is, the inner area which will be viewed or otherwise used, in use is not compromised. Examples of glasses which maybe beneficially handled include glass sheets with supersoft coatings, glass sheets with metallised coating and glass sheets with reduced U values.

Suitably, a desiccant is provided in the volume between two adjacent glass sheets, for example a first and second glass sheet, in producing a sealed glazed unit.

In producing a multiple, for example double and treble, glazed product, the spacers are suitably located between adjacent glass sheets. The spacers may be isolated, discrete units or may be a spacer bar or other spacer, typically employed in producing multiple glazed units. Preferably, the spacers are located in place automatically in accordance with process controls on an automated process line.

BRIEF DESCRIPTION OF THE DRAWINGS

The present invention is further described by way of example only with reference to the accompanying drawings, in which:

FIGS. 3A to 3D show a schematic perspective view and end view (FIG. 3D) of a sheet being selected and transported from a storage array to an IG line;

DETAILED DESCRIPTION OF THE EMBODIMENTS

Figure 1:
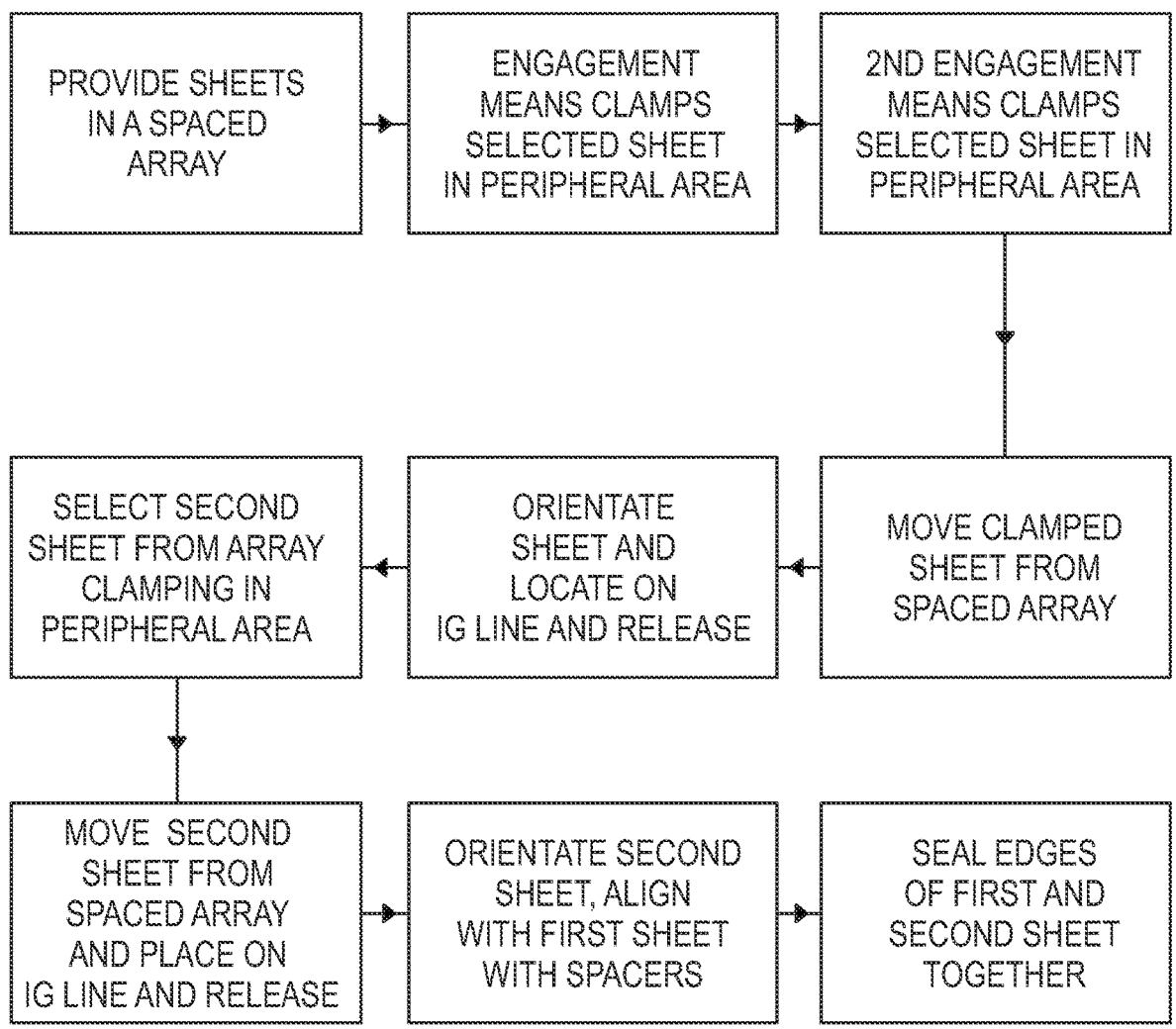
FIG. 1 shows a flow chart of a process according to the invention.

FIG. 1 sets out in a flow chart the process steps of the invention for selecting a sheet from an array, for example a glass sheet from a harp cart in which multiple sheets of glass are stored substantially vertically with gaps between adjacent sheets such that the first and second engagement means of the apparatus may be inserted into the gap ready to engage, preferably by clamping with the sheet about its peripheral area. The apparatus is brought into proximal relation with the edge of the sheet, selected suitably according to information contained in a control system in communication with the apparatus, and the first and second engagement means may then be brought into engaging contact and clamp the selected sheet. The sheet is then withdrawn from the array and orientated into a desired position, placed on a processing line, for example an IG production line and released. A second sheet is then selected from the array, clamped, withdrawn and orientated in a similar manner and placed on the production line. The two sheets upon being placed in a pre-determined relationship, for example in register, with spacers between the sheets, may then be processed by sealing around the periphery of the sheets and evacuation of the space between the sheets so as to form a double or multiple glazed unit.

Figure 2:
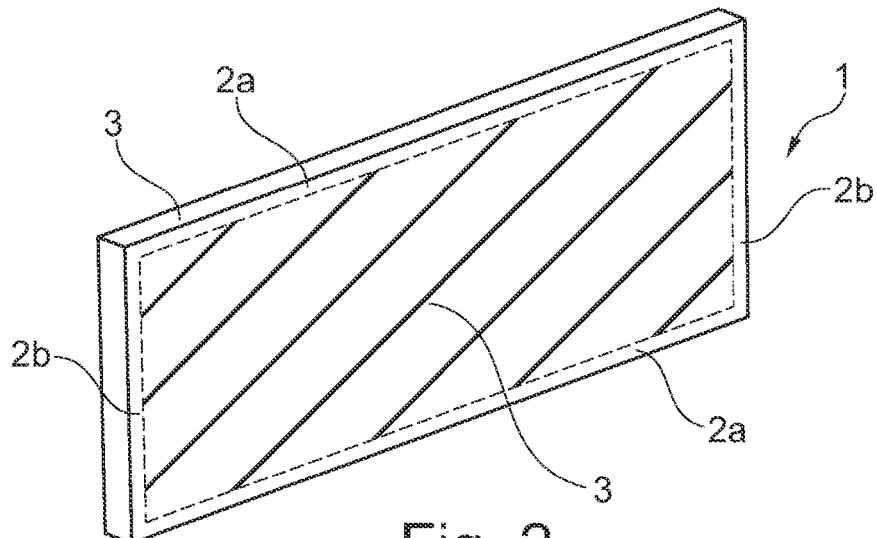
FIG. 2 shows a sheet to be transported by apparatus of the invention and according to the process of the invention.

FIG. 2 shows a glass sheet (1) with a peripheral area comprising a boundary area (2a, 2b) around the outside of the sheet which is suitable for the engagement means to engage the sheet. The inner area (3) will be visible once the sheet is in use, for example as a double glazing unit, and the process avoids all contact with this area, thereby avoiding undesirable marking of the sheet.

FIG. 3A shows an array of sheets (1), for example on a harp cart, and apparatus according to the invention having first and second engagement means (4, 5), mounted on a support (6) in the form of a rail. The support (6) may be a single support or each engagement means may have its own support. The at least the second engagement means (5) is mounted for movement along the rail (6). The rail and engagement means may be moved in any direction by support arm (7), for example a robotic arm or arms, and is suitably powered and controlled by mechanism (8). FIG. 3B shows the apparatus engaged with sheet (1) with engagement means (4, 5) clamping the sheet in the peripheral area (2b) so as to enable the weight of the sheet to be supported and withdrawing it from the array in the direction of arrow A. While the engagement means (4, 5) are engaged with or gripping the sheet, the support (6) or supports are movable both in and out of the plane of the rigid sheet such that the sheet may be moved from a first place to a second place. The sheet may be moved within the plane of the sheet as shown in FIG. 3C in a direction that is parallel, perpendicular, as shown by Arrow A or orthogonal relative to the edge of the sheet or a line between the first and second engagement means. The support (7) may be moved in a direction which is out of the plane of the sheet, for example rotation as shown by Arrow B in FIG. 3D.

FIG. 3D shows the withdrawn sheet having been rotated about a vertical axis in direction B after withdrawal from the array such that the sheet is orientated into a desired position. The sheet is then placed on the production line of an IG process, shown end-on in FIG. 3E with the sheet being supported by base (10) and leaning against wall (11), generally vertical but at an angle α, typically between 5 and 10° to the vertical.

The sheet is conveyed from its storage location into a production line for further processing without contact being made with the inner area of the sheet.

Figure 4:
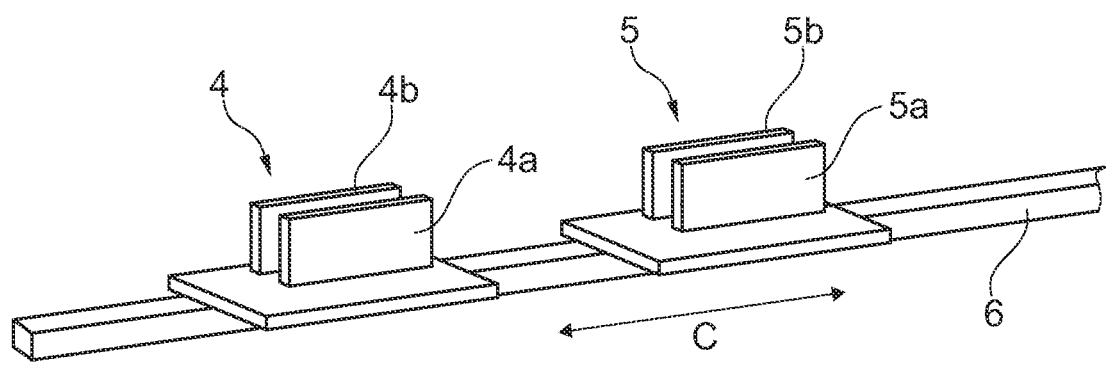
FIG. 4 shows a perspective view of apparatus according to the invention.

FIG. 4 shows support (6) having first and second engagement means (4, 5) which are movable in direction C, that is longitudinally along support (6).

Figure 5:
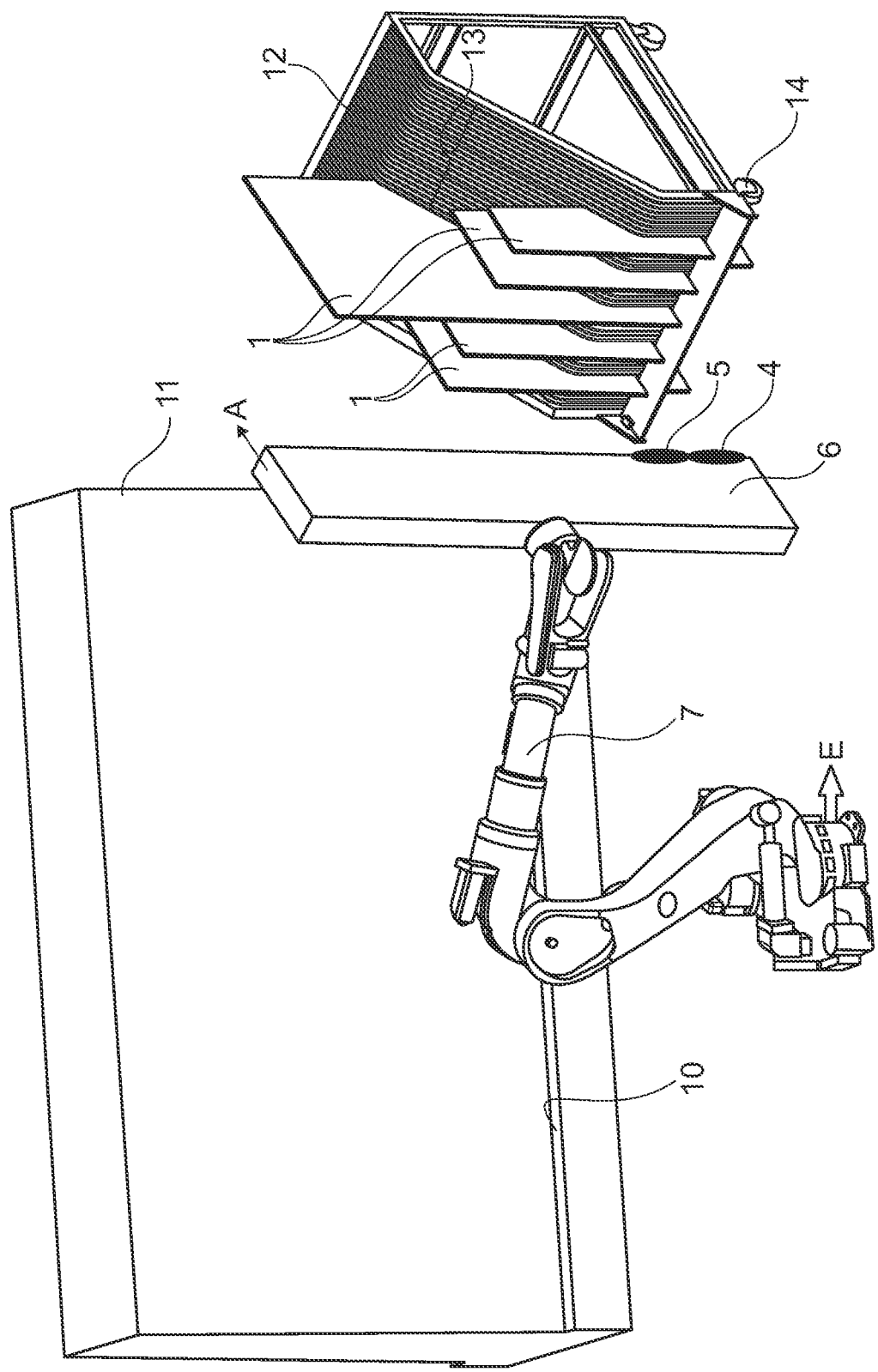
FIGS. 5 to 10 show a series of perspective views of apparatus according to the invention operating a process according to the invention.
Figure 6:
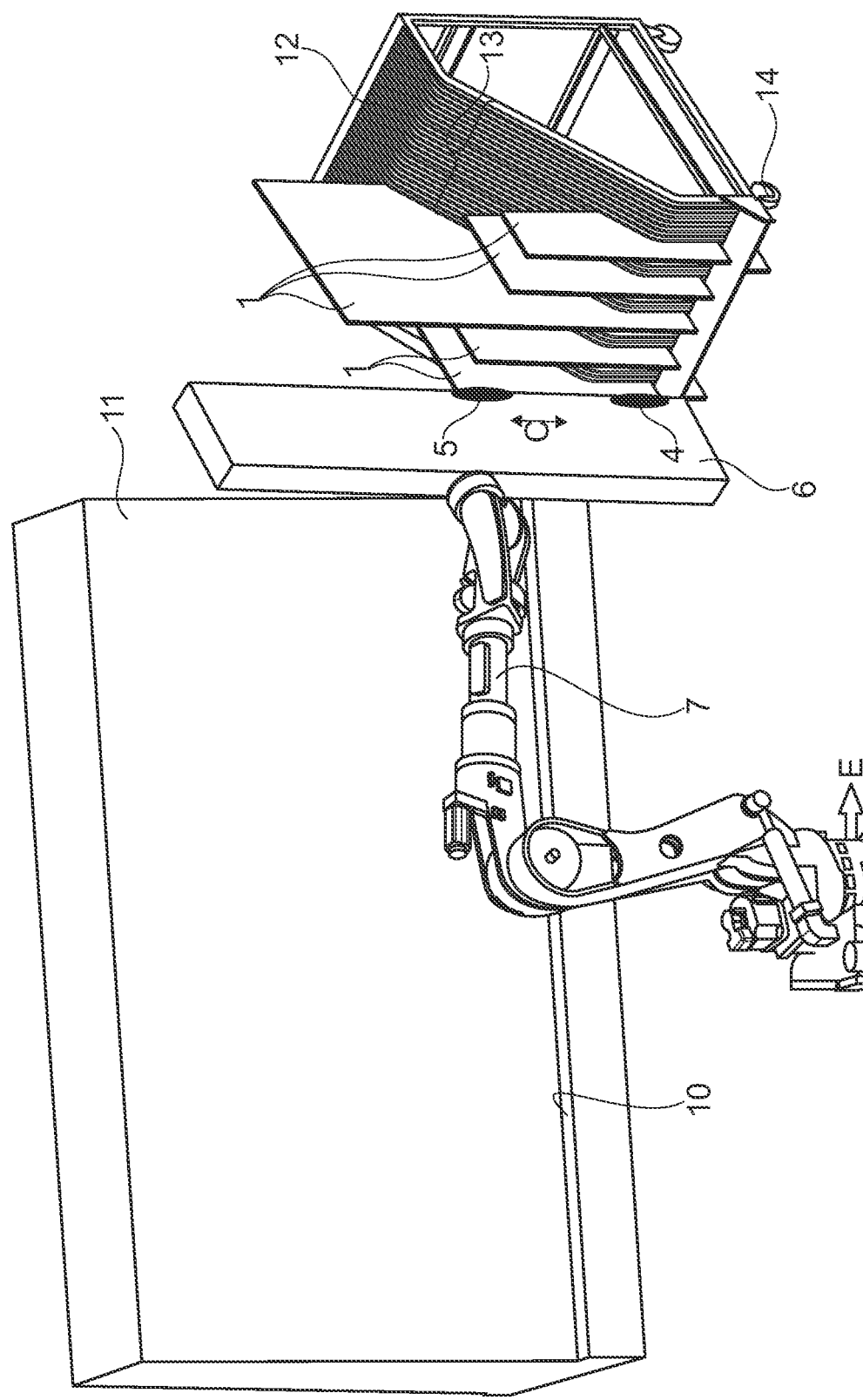

FIG. 5 shows a robotic arm (7) which carries the support (6) as is universally movable. The whole arm itself may move towards or away from the harp cart (12) which carries multiple rigid glass sheets (1). The arm (7) moves the support (6) carrying the engagement means (4, 5) towards the selected sheet (1) in direction A. FIG. 6 shows the apparatus in position by the far-most sheet with the engagement means having been moved in direction C and gripping the selected sheet (1). The apparatus is guided to the appropriate location for the engagement means to grip the selected sheet using any suitable means including detectable locators or trackers or markers.

In a preferred embodiment, the sheets (1) are carried on a harp cart (12), which comprises a plurality of guide means (13) to hold a plurality of sheets (1) in a parallel configuration with each sheet being separate from the other sheets, thereby to facilitate access of the engagement means (4, 5) to grip the selected sheet.

The position of each sheet (1) in the harp cart is suitably pre-determined such that the robotic arm may precisely locate the support (6) such that the engagement means (4, 5) are readily able to engage with the selected sheet (1). The apparatus is suitably controlled by a control system. Information relating to each sheet (1), for example its size, location, orientation, intended product or unit, customer information and the like is suitably included in or usable by the control system whereby knowledge of the location of the control system and the harp crt and/or the selected sheet may be used as an initial reference point from which the apparatus and sheet may be brought together and the sheet engaged by the engagement means.

Suitably, the arm (7) is computer-controlled and automated. Control of the arm is suitably carried out by the control system and in accordance with an algorithm and information relating to the sheet to be selected is provided such that the arm automatically moves to a precise location to then enable secure engagement with the selected sheet.

Figure 7:
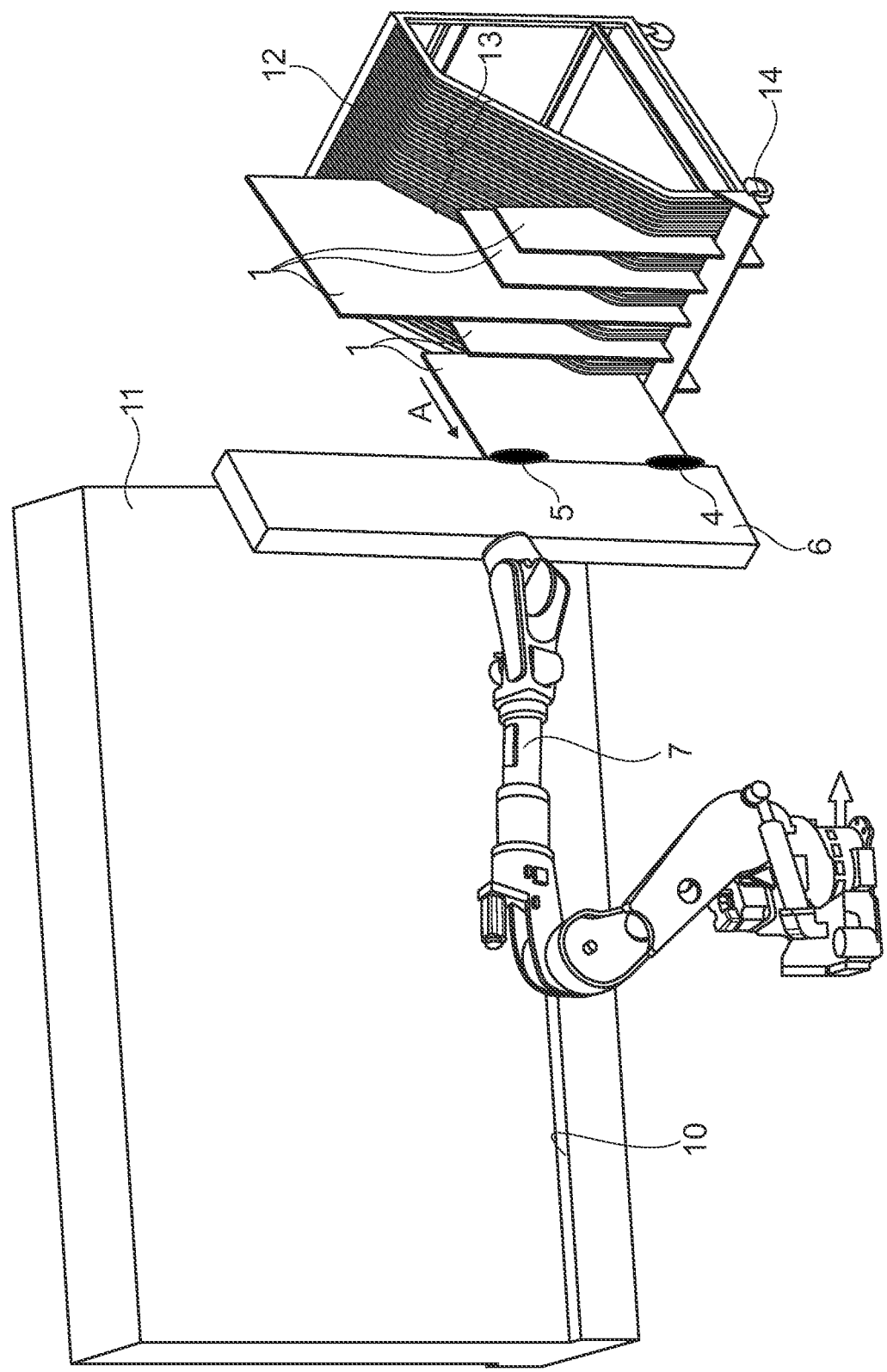
Figure 8:
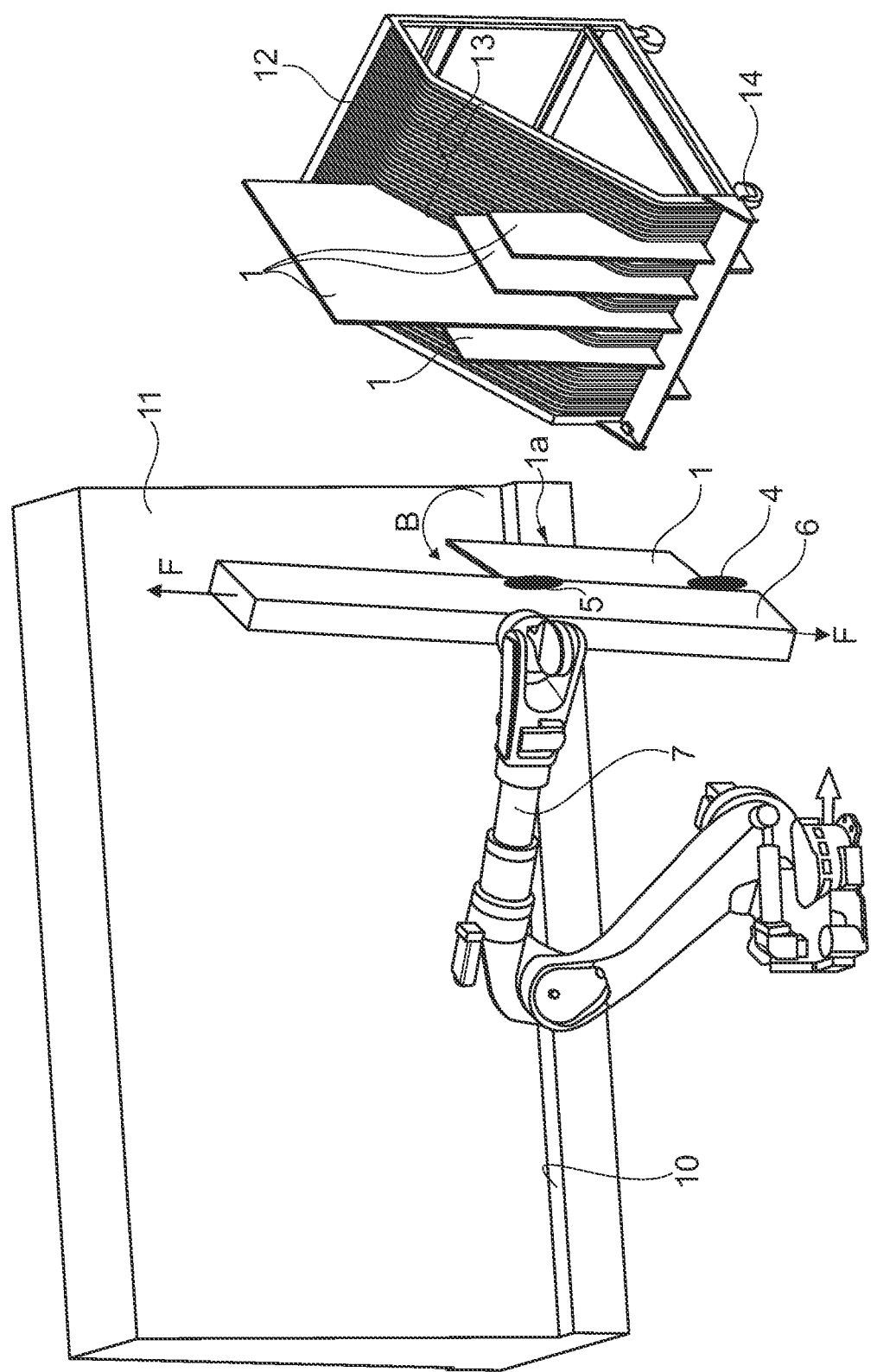
Figure 9:
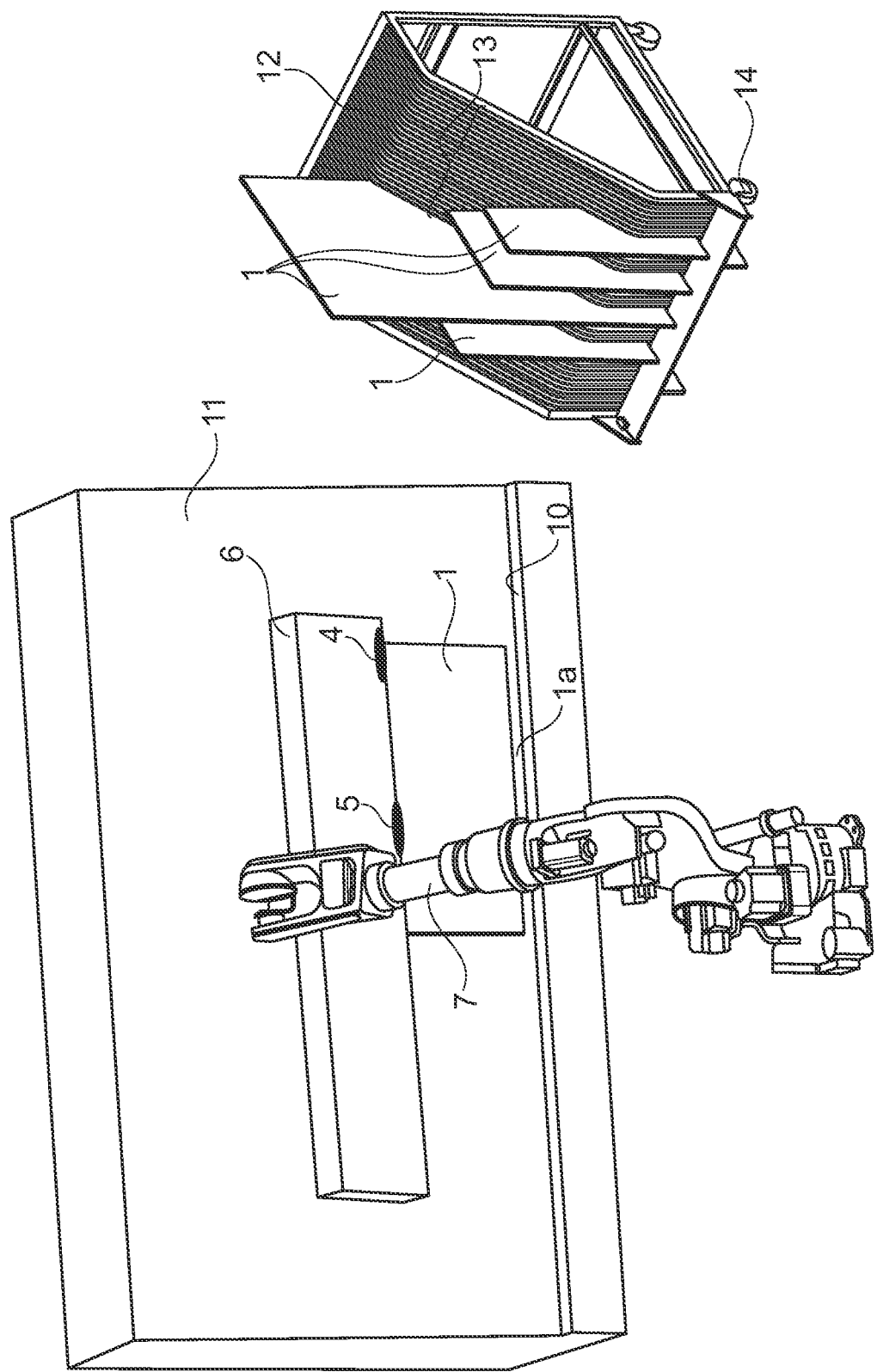
Figure 10:
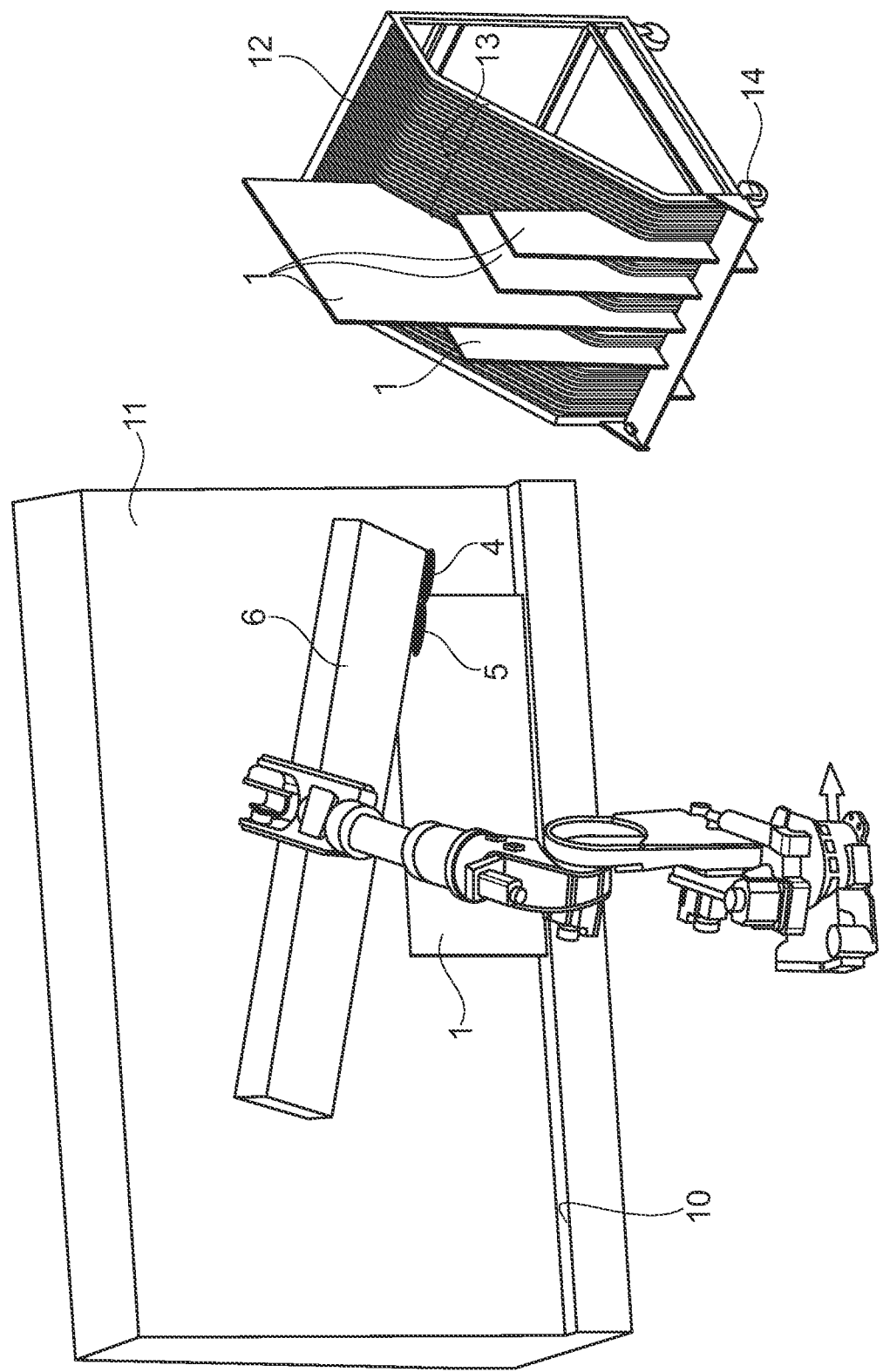

As shown in FIG. 7, once the sheet is gripped, it is then withdrawn from the harp cart (12) in direction A, which is in the plane of the sheet and perpendicular to the line between the engagement means (4, 5). Once the far edge (1a) of the sheet is clear of the harp cart (12), the arm rotates the support (6) in direction B about axis F, as shown in FIG. 8. In FIG. 9, the support (6) has been rotated such that the far edge (1a) of the sheet is below the support (6) and positioned to be located on base (10). Upon locating the sheet on base (10) and against wall (11), the sheet is released by the engagement means (4, 5) and the support (6) moves away from the released sheet to complete the operation of transferring the sheet as shown in FIG. 10. The apparatus may return to the position as shown in FIG. 1, ready to repeat the process with another sheet.

The invention claimed is:

1. A process for handling a rigid sheet having two faces, each face comprising a peripheral area extending around the periphery of the sheet and the remainder of the face comprising an inner area, enclosed by the peripheral area, the process comprising:
   i) providing first engagement means adapted to engage the sheet on the peripheral area of at least one face on a first edge of the sheet and providing second engagement means adapted to engage the sheet on the peripheral area of the same edge of the sheets the first engagement means, the first and second engagement means being arranged so as to enable relative longitudinal movement between the first and second engagement means and able to carry the weight of the sheet;
   ii) locating the first engagement means adjacent to the sheet and engaging the sheet on the at least one peripheral area of the said face;
   iii) locating the second engagement means adjacent to the sheet;
   iv) effecting relative longitudinal movement between the sheet and the second engagement means whilst the sheet is engaged by the first engagement means;
   v) engaging the sheet with the second engagement means so the sheet is held and its weight borne by the first and second engagement means; and
   vi) retaining the first and second engagement means engaged with the sheet in fixed relation and moving the engagement means and sheet to a second location.

2. A process according to claim 1 wherein in step iv), the second engagement means is adapted to maintain the sheet between the second engagement means during the relative movement between the sheet and the second engagement means.

3. A process according to claim 2 wherein during relative movement between the sheet and the second engagement means, the second engagement means contacts the sheet in the event that the plane of the sheet diverges from the locus of movement of the second engagement means thereby to hold the sheet in a pre-determined configuration.

4. A process according to claim 3 wherein the pre-determined configuration of the sheet is planar.

5. A process according to claim 1 wherein the first engagement means and/or the second engagement means comprise a longitudinally extending clamping face which, in use, extends along the periphery of the sheet.

6. A process according to claim 5 wherein the clamping face is dimensioned so as not to extend to the inner area of the sheet when in the clamped configuration.

7. A process according to claim 1 wherein the first engagement means and/or the second engagement means comprise a fixed jaw and a movable jaw.

8. A process according to claim 1 wherein the first and second engagement means are adapted for handling a planar rigid sheet wherein the first and second engagement means are arranged on a straight locus and adapted for relative movement towards and away from the other engagement means along the locus and the second engagement means are adapted to contact the sheet where the planar sheet is warped or flexed so as to straighten the sheet to a planar configuration by virtue of the relative movement between the first and second engagement means.

9. A process according to claim 1 wherein an algorithm is employed to control at least one step of the process.

10. A process according to claim 9 wherein the algorithm determines the size of the sheet, at the location at which the engagement means engage with the sheet.

11. A process according to claim 1 wherein the relative movement between the first and second engagement means is controlled by an algorithm.

12. A process according to claim 1 wherein the said sheet is moved to a second location where there is a further sheet located and aligning the said sheet with the further sheet in a parallel relationship, the process comprising the further step of sealing the edges of the said sheet and the said further second sheet to enclose a volume between the sheets to provide a multiple-sheet product.

13. A process according to claim 12 wherein the sheets are glass and the volume between the sealed sheets is evacuated so as to provide a multiple glazed, sealed unit.

14. Apparatus for handling a rigid sheet having two faces, each face comprising a peripheral area extending around the periphery of the sheet and the remainder of the face comprising an inner area, enclosed by the peripheral area, the apparatus comprising first engagement means adapted to engage at least one face of the sheet in the peripheral area on a first edge of the sheet, second engagement means adapted to engage at least one face in the peripheral area on the same edge of the sheet as the first engagement means, the first engagement means and/or second engagement means being adapted to move longitudinally relative to the other engagement means along the first edge so as to enable relative movement therebetween, the first and second engagement means further being adapted to move in concert in a fixed relative position whereby the sheet is movable from a first location to a second location.

15. Apparatus according to claim 14 wherein the first engagement means and/or the second engagement means comprise a longitudinally extending clamping face which, in use, extends along the periphery of the sheet.

16. Apparatus according to claim 14 wherein the first engagement means and/or the second engagement means comprise a fixed jaw and a movable jaw, each jaw having a parallel facing clamping surface.

17. Apparatus according to claim 14 wherein the first engagement means and second engagement means are mounted on a common support and the support is moveable so as to be capable of moving the sheet, when engaged, to a second location.

18. Apparatus according to claim 17 wherein the support comprises a guide rail and the first and second engagement means are mounted on the locus of the rail and along which the second engagement means may move back and forth relative to the first engagement means.

19. Apparatus according to claim 14 wherein the support or supports are movable both in and out of the plane of the rigid sheet in a direction that is parallel, perpendicular or orthogonal relative to a line between the first and second engagement means.

20. Apparatus according to claim 14 wherein the first and second engagement means are adapted to move in concert from the first location to the second location whilst remaining in a fixed relative position to each other, wherein an axis between the first and second engagement means in the second position is orthogonal to the axis between the first and second engagement means in the first position.

* * * * *